United States Patent Office 3,216,215
Patented Nov. 9, 1965

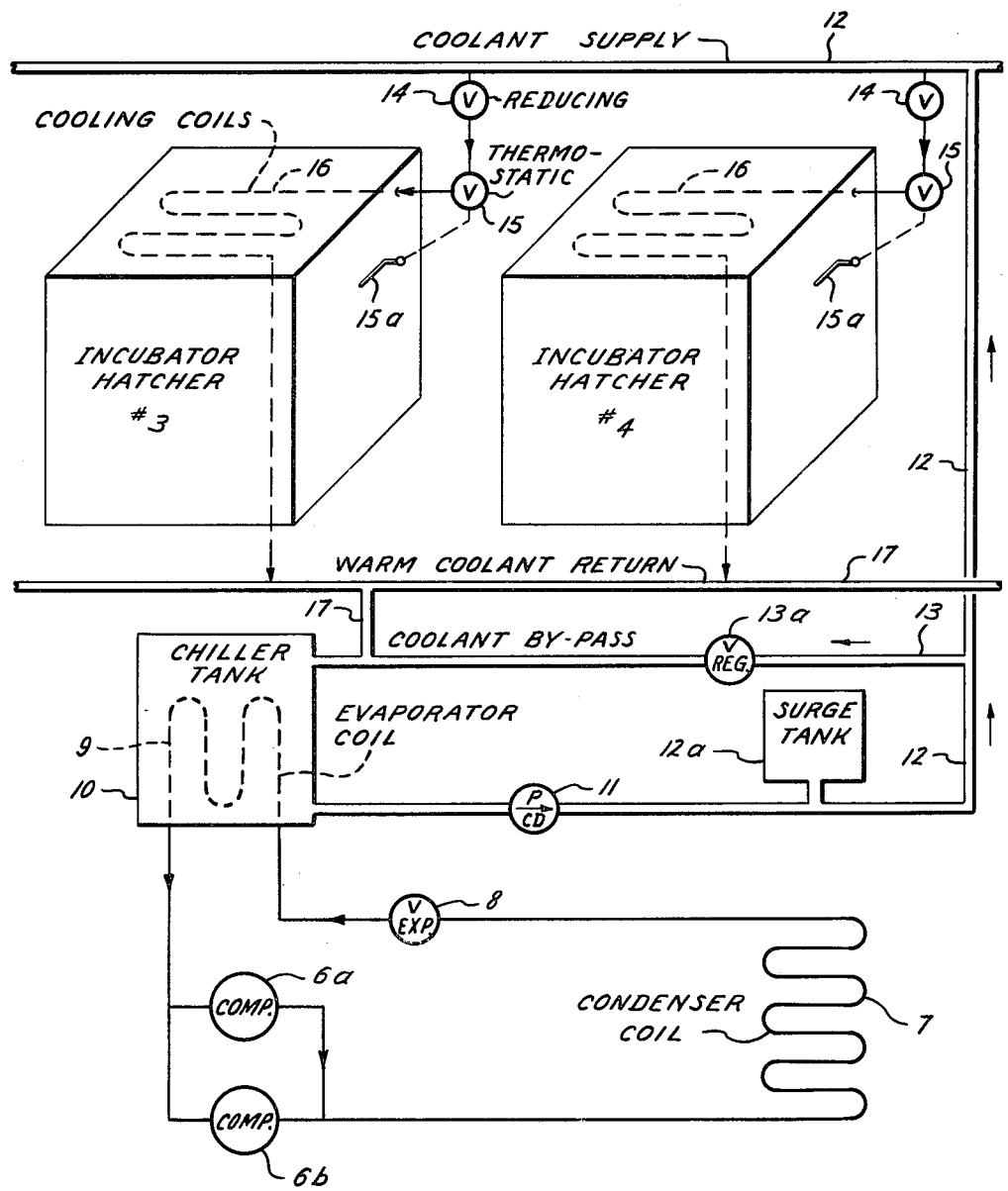

3,216,215
TEMPERATURE CONTROLLED
INCUBATOR-HATCHERS
Donald F. Schuett, c/o Climate Inc., P.O. Box 932,
Austin, Tex.
Filed Feb. 27, 1964, Ser. No. 347,819
4 Claims. (Cl. 62—185)

This invention relates to incubator-hatchers in which eggs, usually of poultry or fowl, are incubated and hatched, and more particularly to the features thereof and in association therewith by which heat from any source, is carried off so that the incubator-hatcher is maintained at the desired temperature.

For many years now the incubator-hatching business has been one of the really large businesses in the food industry, and literally millions of eggs annually (often a million in a single hatchery) are placed in incubator-hatchers—a sort of box with various air-conditioning features—for incubation and hatching. The desires for best conditioning of the air in such incubator-hatchers include proper humidity control, maintenance of proper carbon dioxide balance, air circulation, and of course temperature control—in a context wherein the eggs and animals generate heat themselves that must be carried off or disposed of in some manner. See as one example of prior thinking, Ross Patent 2,026,801.

The common practice for years has been to assemble a bank or a group of these incubator-hatchers in close proximity to each other, each of a size determined by factors not germane to this invention, but each requiring for best results, accurate temperature control, which is a subject of this invention.

For example, many operators desire to maintain the incubator-hatchers at an average temperature of 99½ degrees F. for incubating chicken eggs, or up to 99¾ degrees when the incubator is only partly filled. Temperature in the hatching compartment at the time of transfer is preferred by many such operators to be 98½ degrees. Then at the end of the 21st day when the chicks are practically all hatched the temperature is often lowered to 97 degrees.

These temperatures must be maintained with tolerable accuracy, without upsetting the carbon dioxide balance in the air, the humidity or the like, and these considerations in combination with cost considerations rule out conventional air-conditioning systems as highly unpreferred. But a further more fundamental engineering problem has plagued the many who sought to air-condition a bank of incubator-hatchers with ordinary air-conditioning equipment:

The group of incubator-hatchers in a bank, may at times of day and climate and incubation load all be drawing little to no cooling and then all demand full load almost at once. And when the total average requirements of all the incubator-hatchers are perhaps half the capacity of the refrigeration unit, the individual incubator-hatchers place their loads upon the system at odd and nonsynchronized times, thus giving very rapid and frequent off-on cycling of the equipment with sharply varying loads—to an extent that conventional equipment has been found unsatisfactory for the purpose. The motors burn out from too many starts and stops too close upon each other; the starter switches give trouble from too many operations; etc.

And many of these units are used in relatively out of the way places where service is slow to come by and thousands of dollars worth of eggs or baby chickens or turkeys may be lost while waiting on service.

As a result of these and other problems the vast majority of systems in use today use fresh water supplies for cooling purposes, wastefully discarding the warmed water after use.

Thus in the air-conditioning of the incubator-hatchers is found the combination of an acute need for reliability of the equipment together with extreme load variation patterns that place demands on the equipment beyond conventional equipment's capacity to handle with the required reliability.

It is this special need for extra reliability in this context of extra heavy demands upon the equipment by virtue of the peculiarly frequent and extent load variations, that brought applicant to undertake the labors that eventually resulted in this invention.

Accordingly, it is apparent that an object of this invention is to provide improved means for cooling a group of incubator-hatchers which is more reliable than conventional systems. Other objects such as modest cost, operating expense, etc., are apparent from this description and the accompanying drawing wherein there is disclosed schematically one embodiment of an incubator-hatcher system in accordance with this invention.

These objects are accomplished in accordance with this invention by arranging for cooling of the bank of incubator-hatchers not with the primary refrigerant, like the Freon in an office or home air-conditioning system or refrigerator, as does for example, Hoffmann 1,782,688 and Hoffmann 2,522,948.

Rather, in accordance with this invention a first substantially conventional refrigeration system is used to cool a second coolant fluid, which may conveniently be water. This second coolant fluid is stored in sufficient quantity in the system that individual incubator-hatcher load changes don't draw down the water temperature excessively in either amount or speed of change; and also this coolant is continuously circulated to keep the water cooling efficient and to serve some other purposes, among the most critical of which is:

Neither the compressors nor the machinery for moving the incubator-hatcher coolant fluid cycles with every incubator-hatcher load change. In accordance with this invention, the problem-producing frequent-cycling of motors and compressors or pumps is solved by valving of continuous moving coolant, rather than by off-on cycling.

The invention is best understood by reference to the drawing which discloses one exemplar of a system incorporating the invention.

The beginning of a series of incubator-hatchers is illustrated simply as boxes 3 and 4. Access doors, drip pans, air circulation means, humidity control means (which may be affixed to the cold water system of this invention) and other such details are not illustrated since they are not a part of this invention. And while the boxes illustrated are numbered 3 and 4, it is of course understood that there may be others in the same system, six to a hundred such units being not uncommon numbers for inclusion in a single cooling system.

The primary source of cooling which eventually winds up cooling the incubator-hatchers 3 and 4, may conveniently take the form of typical home refrigerator or air-conditioning systems schematically illustrated on the drawing as a pair of compressors 6a and 6b, discharging to a condenser coil 7 which is connected through an expansion valve 8 to a coil evaporator 9 from which the compressors 6a and 6b take suction.

Since at various times and circumstances the system needs on the order of half the capacity that is required for total peak loads, the use of two appropriately sized compressors instead of one large one, affords greater efficiency as well as a stand-by minimum operating capacity should one compressor or its controls be temporarily disabled. More important, it reduces the number of on-off cycles which any given motor or compressor or the controls therefor must go through in any year's operation, thereby increasing the reliability of the system by reducing the demands which off-on cycling present.

In accordance with this invention, a secondary and continuously circulating cooling system is interposed between that primary source of cooling 6, 7, 8, 9, and the incubator-hatchers 3, 4, etc.

This secondary system may conveniently take the form of a cold water system comprising a chiller tank 10 discharging into a continuous delivery pump 11, which in turn discharges to a coolant supply line 12 (that may conveniently have a surge tank 12a therealong), and having several alternative discharge paths through which coolant may return back into the chiller tank 10.

One of those return paths is through a coolant by-pass line 13 in which may be located a pressure regulator valve 13a of a type designed to maintain constant pressure on the upstream side thereof. This valve 13a is set to maintain a pressure just above the normal coolant supply pressure, for example 35 pounds, and whenever the pressure in that line exceeds 35 pounds the valve 13a opens and by-passes coolant directly back into the chiller tank 10, thus affording continuous operation of the pump 11 and avoiding off-on cycling of the pump, its motor and controls therefor. In one preferred operation there is always at least a little water passing through the by-pass 13.

The other return paths from the coolant supply line 12 to the chiller tank 10 are in circuit-parallel with the by-pass 13, but each is a return through a different incubator-hatcher to afford controlled cooling thereto.

Thus, there may be provided for each incubator-hatcher a pressure reducing valve 14 connected to the coolant supply 12, though in some system designs these pressure reducers 14 at this location are not necessary.

Receiving coolant at a constant pressure from each such pressure reducing valve 14, is a valve 15 responsive to temperature in its corresponding incubator-hatcher. Any one of several thermostatically controlled valves on the market are convenient for this application, and the temperature responsive element 15a, commonly of thermostatic design, may be located in the incubator-hatcher at any one of several locations, as for example on the side wall perhaps half way between floor and ceiling of the incubator-hatcher.

Cooling heat exchange means are provided in each of the incubator-hatchers, and in the embodiment illustrated this cooling heat exchange means takes the form of a coil of pipe or tubing illustrated at 16 and deriving its coolant from the thermo-responsive valve 15.

The various cooling heat exchange means 16 discharge coolant into a warm coolant return line 17, thence back into the chiller tank 10.

It is apparent that the combination of the chiller tank 10 and coil 9 evaporator is a heat exchange unit by which the refrigerant of the compressor system 6, 7, 8 and 9 draws heat from the coolant in the pump system 10, 11, 12, 13, 14, 15, 16, 17. Other forms of heat exchangers may be used here, but there are significant advantageous features to the coil-9-in-tank-10 arrangement.

Preferably the return coolant is adapted to agitate the coolant water in tank 10 for more efficient heat transfer from the coil 9. The surplus of coolant in the tank which serves as storage, serves also to absorb the thermal shock of any sudden return of warm coolant when one or two or ten incubator-hatchers take load simultaneously and the by-pass 13 is suddenly shut off by valve 13a. This absorbtion of thermal shock prevents false-start cycling of the compressors which respond directly or indirectly to evaporator temperature and to coolant temperature in tank 10.

In the absence of this tank-of-secondary-coolant-with-coil-of-primary-refrigerant-arrangement, or some reasonable equivalent thereof, a minor change in warm coolant inlet temperature at the time one incubator-hatcher first cuts on may cause the second compressor to start unnecessarily and run for only a minute and then cut off again with resultant unnecessary wear and inefficiency that is avoided by the action of the cool water reservoir of tank 10 receiving the return warmed coolant.

The function of the reservoir of cold secondary coolant, is similar to a heat or temperature surge tank: It smoothes out the temperature variations, with resultant reduction in off-on cycling and increase in several factors of efficiency. Some of this desired function can be accomplished with structures other than an evaporator coil of primary refrigerant inside a tank of secondary coolant—as for example, a relatively large volume vessel or conduit can receive the return warm coolant and mix it with other by-pass and return coolant before any of it is fed to a heat exchanger to give up heat to the primary refrigerant—but the coil-evaporator-in-coolant-tank arrangement is easy to design and build and works well.

The primary refrigeration system 6, 7, 8, 9 must of course be temperature responsive to the coolant in the secondary system 10, 11, 12, 13, 14, 15, 16, 17. In many installations the secondary coolant is found to be best maintained at 55° F. though the equipment should carry adjustability of this temperature at least to ten degrees on either side of 55°. Various designs and locations of temperature responsive means (not shown), by which the compressors 6a and 6b are rendered responsive directly or indirectly to the temperature of the coolant in the secondary system, may be used.

However, the best "thermal surge tank" function is obtained when the coolant temperature responsive control for the compressors is not located immediately adjacent the coil evaporator 9 or the inlet for coolant return. Preferably that temperature responsive control is located even downstream of the pump 11, thereby to slow the compressor response to sudden surges of warm return coolant and reduce the cycling of the compressors 6a and 6b.

Modifications may be made in and additions may be added to the structure above described for exemplary purposes without departure from the scope of the invention. For example, it will be normal to add a water make-up inlet, perhaps opening into the chiller tank to make up any water that may be lost through leaking from the normally closed system, or through use of coolant water by humidifier systems that may be appended thereto. Or the by-pass 13 may be connected from the far end of the coolant supply 12 so that circulation through the by-pass also passes through the entirety of the coolant supply to keep the coolant from warming excessively in some portion of the coolant supply line 12 that becomes dead-end for a while during an off load of the nearby incubator-hatchers. Or depending upon design a surge tank or "accumulator" may be added to the primary refrigeration system 6, 7, 8, 9 or deleted from the secondary cooling system 10, 11, 12, 13, 14, 15, 16, 17. Some may even sacrifice good individual temperature control by putting two incubators in series of a coolant path, instead of all of the incubators in parallel as is preferred.

Accordingly, the foregoing description is to be considered as illustrative only, and is not to be construed as any limitation upon the invention as defined in the following claims.

I claim:

1. In a system of a plurality of incubator-hatchers each having a cooling heat exchange means therein and related cooling apparatus including a compressor, condenser, and evaporator adapted to have refrigerant circulated therethrough to cool said evaporator, the combination therewith of features as follows:

said evaporator being located in a chiller tank adapted to hold a supply of coolant fluid whereby said evaporator operates to cool said coolant fluid;

a continuous running pump taking suction upon the coolant in said chiller tank and discharging to a coolant supply line;

a coolant by-pass having pressure responsive means therein and connected between said coolant supply line and said chiller tank whereby coolant is discharged from said coolant supply line into said chiller tank whenever the pressure in said coolant supply line execeeds a predetermined level;

for each of said incubator-hatchers a pressure reducing device connected to receive coolant from said coolant supply line and to discharge such coolant at a desired pressure, a valve means responsive to temperature in said incubator-hatcher connected to receive coolant from said pressure reducing device;

heat exchange means located in said incubator-hatcher and connected to receive coolant from said valve means, whereby said coolant may be brought to absorb heat from said incubator-hatcher;

and warm coolant return conduit connected to receive coolant from all such heat exchange means and return it to said chiller tank.

2. In a system of a plurality of incubator-hatchers having a cooling heat exchange means therein and related cooling heat exchange means therein and related cooling apparatus including a compressor, condenser and evaporator adapted to have refrigerant circulated therethrough to cool said evaporator, the combination therewith of features as follows:

said evaporator being part of a heat exchange unit by which a secondary coolant fluid is cooled;

a continuous delivery pump taking suction upon the coolant in said heat exchange unit and discharging to a coolant supply line;

a coolant by-pass connected between said coolant supply line and said heat exchange unit whereby coolant is discharged from said coolant supply line into said heat exchange unit whenever the discharge pressure of said pump exceeds a predetermined level;

for each of said incubator-hatchers a valve means responsive to temperature in said incubator-hatcher and connected to receive coolant from said coolant supply line;

heat exchange means located in said incubator-hatcher and connected to receive coolant from said valve means, whereby said coolant may be brought to absorb heat from said incubator-hatcher;

and warm coolant return conduit connected to receive coolant from all such heat exchange means in incubator-hatchers and return it to said heat exchange unit.

3. In a system of a plurality of incubator-hatchers each having a cooling heat exchange means therein and related cooling apparatus including a compressor, condenser and evaporator adapted to have refrigerant circulated therethrough to cool said evaporator, the combination therewith of features as follows:

a chiller adapted to hold coolant fluid and constituting with said evaporator a chiller heat exchange unit by which said coolant fluid is cooled;

the cooling heat exchange means located in each incubator-hatcher being connected to receive amounts of said coolant varying in response to the temperature in said incubator-hatcher and to discharge warmed coolant back to said chiller tank, whereby said incubator-hatcher is cooled whenever its temperature exceeds a predetermined setting;

a coolant by-pass means in circuit parallel with said cooling heat exchange means located in each incubator-hatcher, said coolant by-pass means being connected to by-pass coolant from the upstream side to the downstream side of said cooling heat exchange means whenever the pressure differential thereacross exceeds a predetermined value;

and pump means adapted continuously to move coolant in the coolant circuit comprising said chiller heat exchange unit wherein the coolant gives up its heat and the circuit parallel connection of said by-pass and the incubator-hatchers where the coolant absorbs heat from the incubator-hatchers.

4. A system of incubator-hatchers and related cooling apparatus comprising the combination of:

refrigeration apparatus including a compressor, a condenser for giving up heat, an evaporator heat exchanger for absorbing heat from a coolant fluid;

a coolant fluid system comprising said evaporator heat exchanger, a continuous running pump which takes continuous suction on the coolant fluid cooled in the evaporator heat exchanger and discharges it continuously;

a plurality of cooling coils connected to receive coolant from said pump and to discharge back into the evaporator heat exchanger, each of said coils in a different one among a plurality of incubator-hatchers, whereby said coils receive cooled coolant fluid flow variably therethrough in response to temperature variations in the incubator-hatcher to cool such incubator-hatcher;

a by-pass line in parallel with said plurality of incubator-hatchers for receiving coolant from said pump and, by-passing that portion of the pump's discharge not required by said incubator-hatchers back into the evaporator heat exchanger, whereby the continuous running pump's discharge may be maintained at approximately constant pressure even when different cooling coils are cutting off and on in response to temperature variations in their respective incubator-hatchers;

whereby cooled coolant fluid is being continuously circulated from the evaporator heat exchanger back again to the evaporator heat exchanger through one or more among the by-pass and the various cooling coils connected to the pump discharge.

References Cited by the Examiner

UNITED STATES PATENTS

| 1,044,444 | 11/12 | Englesson | 137—108 |
| 2,237,304 | 4/41 | Greenlee | 62—185 |
| 2,516,508 | 7/50 | Donner | 137—115 |

FOREIGN PATENTS

| 588,566 | 11/33 | Germany. |
| 265,303 | 2/50 | Switzerland. |

WILLIAM J. WYE, *Primary Examiner.*

UNITED STATES PATENT OFFICE
CERTIFICATE OF CORRECTION

Patent No. 3,216,215                      November 9, 1965

Donald F. Schuett

It is hereby certified that error appears in the above numbered patent requiring correction and that the said Letters Patent should read as corrected below.

Column 2, line 11, for "extent" read -- extreme --; column 5, lines 26 and 27, strike out "and related cooling heat exchange means therein".

Signed and sealed this 2nd day of August 1966.

(SEAL)
Attest:

ERNEST W. SWIDER
Attesting Officer

EDWARD J. BRENNER
Commissioner of Patents